United States Patent [19]

Grimaud et al.

[11] 3,968,069

[45] July 6, 1976

[54] POSITIVELY CHARGED AQUEOUS DISPERSIONS OF POLYTETRAFLUOROETHYLENE AND METHOD FOR PREPARING THE SAME

[75] Inventors: Edouard Grimaud, Saint-Geis-Laval; Claude Tournut, Francheville, both of France

[73] Assignee: Produits Chimiques Ugine Kuhlmann, Paris, France

[22] Filed: Sept. 11, 1974

[21] Appl. No.: 505,066

Related U.S. Application Data

[63] Continuation-in-part of Ser. No. 225,305, Feb. 10, 1972, abandoned.

[30] Foreign Application Priority Data

Feb. 19, 1971 France .............................. 71.05713

[52] U.S. Cl. .................. 260/29.6 F; 260/29.6 MN; 428/421
[51] Int. Cl.² ........................................ C08L 27/18
[58] Field of Search ................................ 260/29.6 F

[56] References Cited

UNITED STATES PATENTS

| | | | |
|---|---|---|---|
| 2,559,752 | 7/1951 | Berry | 260/29.6 F |
| 2,891,921 | 6/1959 | Kumnick et al. | 260/29.6 F |
| 3,037,953 | 6/1962 | Marks et al. | 260/29.6 F |
| 3,301,807 | 1/1967 | Hoashi | 260/29.6 F |

*Primary Examiner*—Harold D. Anderson
*Attorney, Agent, or Firm*—Pennie & Edmonds

[57] ABSTRACT

This invention relates to aqueous dispersions of positively charged polytetrafluoroethylene.

This inventon also relates to a process for preparing aqueous dispersions of positively charged polytetrafluoroethylene which comprises adding an aqueous dispersion of negatively charged polytetrafluoroethylene containing an anionic emulsifier to an aqueous solution of a cationic emulsifier kept under light agitation while maintaining a ratio of the molar concentration of cationic emulsifier to that of the anionic emulsifier greater than 1:1.

10 Claims, No Drawings

POSITIVELY CHARGED AQUEOUS DISPERSIONS OF POLYTETRAFLUOROETHYLENE AND METHOD FOR PREPARING THE SAME

This is a continuation-in-part of application Ser. No. 225,305, filed Feb. 10, 1972, now abandoned.

BACKGROUND OF THE INVENTION

1. Field of the Invention

This invention relates to aqueous dispersions of positively charged polytetraflurorethylene and a method for their preparation.

2. Description of the Prior Art

According to known techniques, dispersions of polytetrafluoroethylene are prepared, for example, by polymerizing gaseous tetrafluoroethylene by contact with an aqueous phase containing a polymerization initiator, an emulsifier, and if desired a buffering agent. The resulting polymer is a dispersion of fine particles protected by an emulsifier and generally possesses dimensions less than 0.5 microns.

The course of polymerization of tetraflurorethylene is greatly affected by the presence of organic compounds containing hydrogen and the only useful emulsifiers which are known today are the perfluorocarboxylic or perfluorosulphonic acids, the ω-hydrogenated or chlorofluorinated acids and their alkaline or ammonium salts. Since these compounds are anionic emulsifiers, the dispersions of polytetrafluoroethylene obtained are then often stabilized with a nonionic surface active agent.

Dispersions of various positively charged polymers have been prepared using cationic emulsifiers in the polymerization process. But as stated above, polymerization of tetrafluoroethylene requires the use of emulisifiers all of which are negatively charged and to this day, no cationic emulsifiers are known which would permit one to obtain dispersions of positively charged polytetrafluoroethylene.

SUMMARY OF THE INVENTION

It has been discovered that it is possible to prepare dispersions of positively charged polytetrafluoroethylene in a convenient manner by mixing an aqueous solution of cationic emulsifer with a dispersion of negatively charged polytetrafluoroethylene prepared according to the known and conventional procedures of polymerizing tetrafluoroethylene in the presence of anionic emulsifiers.

Broadly, then, this invention relates to the dispersions of positively charged polytetrafluoroethylene and to the method of preparing such dispersions which comprises adding an aqueous dispersion of negatively charged polytetrafluoroethylene containing an anionic emulsifier to an aqueous solution of a cationic emulsifier kept under light agitation while maintaining a ratio of the molar concentration of cationic emulsifier to that of the anionic emulsifier greater than 1:1.

DESCRIPTION OF THE PREFERRED EMBODIMENTS

The order whereby the components are introduced is essential for success of the method of this invention. In practice, if a few drops of a solution of cationic emulsifier are added to a dispersion of polytetrafluoroethylene prepared using an anionic emulsifier, the dispersion will irreversibly coagulate. On the other hand, if the dispersion of polytetrafluoroethylene is added to a strongly agitated solution of cationic emulsifier, coagulation will not take place if the amount of polytetrafluoroethylene added is not too high.

More precisely, it has been discovered that in order to avoid coagulating the polytetrafluoroethylene, it is necessary that the ratio of the molar concentration of cationic emulsifier to that of the anionic emulsifier be maintained at a value that is substantially greater than 1:1 throughout the duration of the operation. Advantageously this ratio can be maintained at greater than 2:1. While this ratio must be greater than 1:1 the upper limit of the ratio is not critical and as such the upper limit is dictated only by economic factors such as cost of ingredients and the process as will be appreciated by those skilled in the art.

All the cationic emulsifiers are useful for preparing the polytetrafluoroethylene according to this invention including for example, the salts of the primary, secondary and tertiary aliphatic amines, the aliphatic quaternary ammonium salts of the alkylbenzylammonium salts or cyclic compound salts such as the salts of alkylpyridinium. It is advantageous to employ cationic emulsifiers possessing high solubility in water, as for example, the trimethylalkylammonium halides wherein the alkyl chain contains less than 18 carbon atoms, the dimethylbenzylalkylammonium halides or alkylpyridinium halides wherein the alkyl chain contains less than 18 carbon atoms, and oleylamine acetate. Many other cationic emulsifiers are useful in the practice of this invention as is readily understood by one skilled in the art.

The polarity of the charge of the dispersed particles is readily determined by acidifying the dispersion. Several drops of a normal solution of hydrochloric acid are added to two milliliters of the dispersion. A dispersion possessing a negative charge will instantly coagulate while a dispersion having a positive charge will remain stable. Hence, the dispersions of polytetrafluoroethylene of this invention are characterized by remaining stable upon the effective acidification of the dispersions.

The dispersions of polytetrafluoroethylene according to this invention are essentially characterized by their positive charge. They present, moreover, the advantage of possessing a high degree of stability since without the addition of a nonionic stabilizer, the stability of the positively charged dispersions is as good as that of negatively charged dispersions stabilized with nonionic compounds. For example, the dispersions of positively charged polytetrafluoroethylene according to this invention can withstand moderate agitation or vibration without coagulating and they are stable for several months at ambient temperature provided, however, that they are periodically agitated to avoid too high a degree of sedimentation. On the other hand, it is necessary to avoid subjecting the dispersions of this invention to temperatures less than about 0°C or temperatures greater than about 50°C since temperatures outside this range have a tendency to provoke the coagulation of the dispersions upon addition of aqueous miscible solvents, electrolytes or aqueous solutions of anionic emulsifiers.

The dispersions of positively charged polytetrafluoroethylene are stable over a broad range of pH values. However, in order to prevent corrosion of materials coming in contact with these dispersions, it is advantageous to maintain the pH of the dispersions at an approximately neutral level, generally on the order of pH 5 to 7.

The dimensions and form of the dispersed particles of this invention can be quite varied. They generally correspond to those of the negatively charged dispersions of polytetrafluoroethylene from which they are prepared. Thus one can obtain dispersions having approximately spherical-shaped particles of diameters between about 0.05 $\mu$ and 1 $\mu$ and advantageously between about 0.1 and 0.5 $\mu$. The particles can also be elongated in shape, as for example, ellipsoid particles having a minor axis of rotation from about 0.05 to 0.5$\mu$ and a major axis of rotation from about 1.5 to 3 times the length of the minor axis.

The dispersions of positively charged polytetrafluoroethylene of this invention are useful for a number of industrial applications especially interesting in the manufacture of articles such as electrical insulators and conveyor belts.

Cellulosic substrates such as cotton fabric as well as fiberglass and asbestos are well adapted for these applications. Application of the dispersion of positively charged polytetrafluoroethylene upon fabric are carried out according to the known and conventional methods of spread coating or openbath impregnation. For example, to impregnate cotton fabric with the positively charged polytetrafluoroethylene dispersion the fabric is first continuously passed through a dispersion contained in an impregnation tank equipped with detour cylinders, then into a press in order to eliminate excess dispersion and finally, the impregnated fabrics are subjected to a thermal treatment. With known negatively charged particles of polytetrafluoroethylene, it is often necessary to carry out several passes of the fabric through the dispersion in order to deposit a sufficient quantity of polytetrafluoroethylene for the desired effect. The use of dispersions of positively charged polytetrafluoroethylene permits a very high deposition of polytetrafluoroethylene with each pass and as a result, reduces the number of passes required to achieve the proper degree of deposition and thereby provides increased production.

The following examples illustrate positively charged polytetrafluoroethylene dispersions prepared in accordance with this invention.

EXAMPLE 1

10 g of a 10% by weight aqueous solution of dimethylbenzyllaurylammonium chloride were stirred in a beaker by means of a magnetic stirrer. 74 ml of a 30% dispersion of negatively charged polytetraflurooethylene containing 0.76% sodium perfluorooctanoate by weight of polytetrafluoroethylene were progressively introduced into the beaker under continuous stirring. The polytetrafluoroethylene particles were ellipsoids having major and minor axes of rotation measuring 0.3 and 0.15 microns respectively. In this manner, a homogenous dispersion of positively charged particles was obtained, having a concentration of 27% PTFE and 1.4% cationic emulsifier.

EXAMPLE 2

9 g of a 5% by weight aqueous solution of trimethylcetylammonium chloride were stirred in a beaker by means of a magnetic stirrer. 100 grams of a 15% dispersion of negatively charged polytetrafluoroethylene prepared using 0.32% sodium perfluorooctanoate by weight as the perfluorinated anionic emulsifier, were progressively introduced into the beaker under continuous stirring.

In this manner, a homogenous dispersion of positively charged particles having a concentration of 13.7% polytetrafluoroethylene and 0.41% cationic emulsifier was obtained.

EXAMPLE 3

This example demonstrates the influence of the cationic emulsifier employed in the preparation of the positively charged polytetrafluoroethylene dispersion.

A 39.8% dispersion of polytetrafluoroethylene containing 0.45% ammonium perfluorooctanoate by weight of polytetrafluoroethylene was added under stirring to a 5% aqueous solution containing 0.5 millimoles of cationic emulsifier. The appearance of the cationic emulsifier and the volume of dispersion required to provoke coagulation was noted.

The results obtained using this procedure are set forth in the following table and demonstrate the varying effectiveness of several cationic emulsifiers and the need for employing a cationic emulsifier which is soluble in water.

| Cationic Emulsifier | Appearance of the Solution | Volume of Negatively charged Dispersion of Polytetrafluoroethylene |
|---|---|---|
| Laurylamine chloride | slightly turbid | 16 ml |
| Laurylamine acetate | slightly turbid | 15 ml |
| Stearylamine acetate | insoluble | ~0 ml |
| Oleylamine acetate | clear | 25 ml |
| Trimethylcetylammonium chloride | clear | 30 ml |
| Trimethylcetylammonium bromide | clear | 24 ml |
| Dimethylbenzyllauryl ammonium bromide | clear | 32 ml |
| Dimethylbenzyllauryl ammonium chloride | clear | 30 ml |
| Dimethylbenzylcetyl- ammonium bromide | turbid | ~0 ml |
| Laurylpyridinium chloride | clear | 21 ml |
| Stearylpyridinium bromide | turbid | ~0 ml |
| Dimethyldilauryl- ammonium chloride | insoluble | ~0 ml |

EXAMPLE 4

Proceeding as in EXAMPLE 1, a dispersion of positively charged particles of 38.8% polytetrafluoroethylene concentration containing 3.3% dimethylbenzyllaurylammonium chloride by ratio to the amount of polytetrafluoroethylene was prepared.

This dispersion was applied to cellulosic substrates, papers or cotton fabrics, of respective weights of 71 g and 95 g per square meter, comparative to a commercial dispersion of negatively charged polytetrafluoroethylene containing the same amount of resin and stabilized with 6% of nonionic surface active agent of the ethylene oxide/alkyl phenol condensation type.

These dispersions were successively applied to strips of paper and cotton of equal area and the strips were impregnated and pressed under identical conditions, then dried in an electric oven at 85°C for 1½hours, then at 165°C for 15 seconds.

The paper impregnated with the positively charged dispersion of this invention retained 94 g/m² of polytetrafluoroethylene and the cotton retained 104 g/m² of the resin whereas the negatively charged dispersion was retained on these substrates to the extent of only 74 g/m² and 68 g/m² of polytetrafluoroethylene.

Similar results were obtained with fiber glass. However, with thick fabric weighing 310 g/m², the quantities of polytetrafluoroethylene retained were 374 g/m² with the positively charged dispersion and only 180 g/m² with the negatively charged dispersion.

EXAMPLE 5

Proceeding as in EXAMPLE 1, 500g of a negatively charged dispersion of 60% polytetrafluoroethylene concentration containing 6% of a nonionic surface active agent by weight of resin were poured into 100 g of a 10% by weight solution of dimethylbenzyllaurylammonium chloride.

The positively charged dispersion thus obtained was applied to a fiber glass fabric weighing 50 g/m², and 87 g/m² of the positively charged polytetrafluoroethylene was deposited in contrast to only 57 g/m² of the initial dispersion of negatively charged resin.

We claim:

1. A composition consisting essentially of a positively charged aqueous dispersion of solid polytetrafluoroethylene, anionic emulsifier and cationic emulsifier; said cationic emulsifier being present in a molar ratio to the anionic emulsifier that is substantially greater than 1:1.

2. A composition consisting essentially of an aqueous dispersion of solid polytetrafluoroethylene, anionic emulsifier and cationic emulsifier; said cationic emulsifier being present in a molar ratio to the anionic emulsifier that is substantially greater than 1:1 and characterized as non-coagulating upon the effective acidification of the dispersion.

3. A composition according to claim 1 wherein the pH of the dispersion is approximately neutral.

4. A method for preparing a composition consisting essentially of a positively charged aqueous dispersion of solid polytetrafluoroethylene which comprises adding an aqueous dispersion of negatively charged polytetrafluoroethylene containing an anionic emulsifier to an aqueous solution of a cationic emulsifier kept under light agitation while maintaining a ratio of the molar concentration of cationic emulsifier to that of the anionic emulsifier that is substantially greater than 1:1.

5. The method of claim 4 wherein the ratio of the molar concentration of cationic emulsifier to that of the anionic emulsifier is maintained at greater than 2:1.

6. The method of claim 4 wherein the cationic emulsifier is a salt of a primary, secondary or tertiary aliphatic amine, an aliphatic quaternary ammonium salt, an alkylbenzylammonium salt or acyclic quaternary ammonium compound.

7. The method of claim 4 wherein the cationic emulsifier is a dimethylbenzyllaurylammonium halide.

8. The method of claim 4 wherein the cationic emulsifier is a trimethylcetylammonium halide.

9. The method of claim 4 wherein the negatively charged aqueous dispersion of polytetrafluoroethylene is directly obtained from the polymerization of tetrafluoroethylene and does not contain a nonionic stabilizer.

10. The method of claim 4 in which the negatively charged aqueous dispersion of polytetrafluoroethylene contains a non-ionic stabilizer.

* * * * *